US009423930B2

(12) United States Patent
Imamichi et al.

(10) Patent No.: US 9,423,930 B2
(45) Date of Patent: Aug. 23, 2016

(54) MOBILE DEVICE, NETWORK SYSTEM, AND CONTROL METHOD FOR THE SAME

(71) Applicants: Takahiro Imamichi, Kanagawa (JP); Takaaki Harada, Kanagawa (JP)

(72) Inventors: Takahiro Imamichi, Kanagawa (JP); Takaaki Harada, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/748,949

(22) Filed: Jun. 24, 2015

(65) Prior Publication Data

US 2015/0293653 A1 Oct. 15, 2015

Related U.S. Application Data

(63) Continuation of application No. 13/743,923, filed on Jan. 17, 2013, now Pat. No. 9,098,517, which is a continuation of application No. 13/149,191, filed on May 31, 2011, now Pat. No. 8,386,538.

(30) Foreign Application Priority Data

Jun. 9, 2010 (JP) .................. 2010-132013

(51) Int. Cl.
*G06F 17/30* (2006.01)
*G06F 3/0482* (2013.01)
*H04L 29/08* (2006.01)

(52) U.S. Cl.
CPC ........ *G06F 3/0482* (2013.01); *G06F 17/30091* (2013.01); *G06F 17/30274* (2013.01); *H04L 67/06* (2013.01)

(58) Field of Classification Search
CPC ....................................... G06F 17/30
USPC ................................. 707/600–899
See application file for complete search history.

(56) References Cited

U.S. PATENT DOCUMENTS

2002/0073140 A1 6/2002 Chae
2007/0188824 A1 8/2007 Imamichi
(Continued)

FOREIGN PATENT DOCUMENTS

JP 2004-23367 A 1/2004
JP 2004-30325 A 1/2004
(Continued)

OTHER PUBLICATIONS

Office Action issued Oct. 21, 2013 in Japanese Patent Application No. 2010-132013.
Office Action issued Jul. 29, 2014 in Japanese Patent Application No. 2010-132013.

*Primary Examiner* — Isaac M Woo
(74) *Attorney, Agent, or Firm* — Oblon, McClelland, Maier & Neustadt, L.L.P

(57) ABSTRACT

A mobile device includes a file information acquiring unit, a file information display unit that displays the file information acquired on a display unit, a file presence identifying unit that determines whether or not a file specified by file information designated by a user from among the file information displayed on the display unit is stored in a storage unit, a first file transmitting unit that transmits the stored file to another mobile device when the file presence identifying unit determines that the file is stored in the internal storage unit, a file acquiring unit that downloads the file specified by the designated file information from the server when the file presence identifying unit determines that the file is not stored in the internal storage unit, and a second file transmitting unit that transmits the file acquired by the file acquiring unit to the other mobile device.

16 Claims, 9 Drawing Sheets

(56) References Cited

U.S. PATENT DOCUMENTS

| | | |
|---|---|---|
| 2008/0282065 A1 | 11/2008 | Imamichi |
| 2009/0164612 A1 | 6/2009 | Lee |
| 2009/0316685 A1* | 12/2009 | Mandre ............... H04L 12/1818 370/352 |
| 2010/0146450 A1 | 6/2010 | Harada |
| 2010/0198786 A1 | 8/2010 | Imamichi |
| 2010/0199179 A1 | 8/2010 | Suzuki et al. |
| 2010/0228746 A1 | 9/2010 | Harada |
| 2011/0050392 A1 | 3/2011 | Kaizu |

FOREIGN PATENT DOCUMENTS

| | | |
|---|---|---|
| JP | 2006-324940 A | 11/2006 |
| JP | 2008-197839 | 8/2008 |
| JP | 2009-157912 | 7/2009 |
| JP | 2009-193108 A | 8/2009 |
| JP | 2010-86174 | 4/2010 |
| WO | WO 2008/151080 | 12/2008 |

* cited by examiner

FIG.4

| FOLDER ID | FOLDER NAME | FOLDER URL | NUMBER OF FILES INSIDE FOLDER |
|---|---|---|---|
| FOLDER 1 | TRAVEL | http://www.··· | 30 |
| FOLDER 2 | SPORTS DAY | http://www.··· | 25 |
| ⋮ | ⋮ | ⋮ | ⋮ |
| FOLDER n | PLANNING DOCUMENT | http://www.··· | 17 |

FIG.5

| FILE ID | FILE NAME | THUMBNAIL URL | FILE URL | FILE UPDATE DATE AND TIME |
|---|---|---|---|---|
| FILE 1_1 | Camera0001_1.jpg | http://www.··· | http://www.··· | 2010/06/01 12:07 |
| FILE 1_2 | Camera0001_2.jpg | http://www.··· | http://www.··· | 2010/06/01 13:15 |
| ⋮ | ⋮ | ⋮ | ⋮ | ⋮ |
| FILE 1_30 | Camera0001_30.jpg | http://www.··· | http://www.··· | 2010/06/03 09:00 |

FIG.6

| FILE ID | FILE NAME | THUMBNAIL ADDRESS | FILE ADDRESS | DOWNLOAD DATE AND TIME |
|---|---|---|---|---|
| FILE 1_1 | Camera0001_1.jpg | 0x00000000 | 0x00010000 | 2010/06/05 10:08 |
| FILE 1_2 | Camera0001_2.jpg | 0x00000100 | 0x000f0000 | 2010/06/05 10:10 |
|  |  |  |  |  |
| ⋮ | ⋮ | ⋮ | ⋮ | ⋮ |
|  |  |  |  |  |

MOBILE DEVICE, NETWORK SYSTEM, AND CONTROL METHOD FOR THE SAME

CROSS-REFERENCE TO RELATED APPLICATIONS

The present continuation application claims the benefit of priority under 35 U.S.C. §120 to application Ser. No. 13/743,923, filed on Jan. 17, 2013 which is a continuation of U.S. Ser. No. 13/149,191, filed May 31, 2011, which claims priority to and incorporates by reference the entire contents of Japanese Patent Application No. 2010-132013 filed in Japan on Jun. 9, 2010. The entire contents of all of the above-listed documents are incorporated herein by reference.

BACKGROUND OF THE INVENTION

1. Field of the Invention

The present invention relates to a file exchange system in which a file managed by a server on a network is exchanged between mobile devices and a mobile device used in the system.

2. Description of the Related Art

Along with the widespread use of the network, an online storage service is increasingly being used in which a computerized document or image acquired by an information device such as a personal computer (PC), a digital camera, or a mobile telephone (hereinafter, the computerized document or image is referred to as "file") is managed in a server on a network. In this service, by operating the information device, a user can access the server via the network and store the file in an online storage area, assigned to each user, on an internal or external storage device of the server.

Further, a system in which a file is exchanged between portable information devices (mobile devices) has been known. For example, Japanese Patent Application Laid-open No. 2010-086174 discloses that a file is transmitted from one mobile device to another mobile device such that a file existing in one mobile device is transmitted to another mobile device by near field communication such as Bluetooth (a registered trademark) or Infrared Data Association (IrDA), or a file existing in one mobile device is uploaded to a storage device inside a server on a network, and then another mobile device downloads the file. Further, even though not stated in literatures, it has been implemented that a file managed by a server on a network is downloaded by one mobile device and then transmitted to another mobile device by near field communication.

However, in the conventional system, when an exchange target file exists in the mobile device, the user can perform an operation for transmitting the file directly to another mobile device. However, when the exchange target file exists on an online storage, the user has to first perform an operation of downloading the file to the mobile device and then perform an operation of transmitting the file to another mobile device. Thus, there is a problem in that an operation different from the case in which the file exists in the mobile device is necessary, and the number of operations increases.

SUMMARY OF THE INVENTION

It is an object of the present invention to at least partially solve the problems in the conventional technology.

According to an aspect of the present invention, there is provided a mobile device, including: a file information acquiring unit that acquires file information representing a file managed by a server on a network from the server; a file information display unit that displays the file information acquired by the file information acquiring unit on a display unit; a file presence identifying unit that determines whether or not a file specified by file information designated by a user from among the file information displayed on the display unit is stored in an internal storage unit; a first file transmitting unit that transmits the stored file to another mobile device when the file presence identifying unit determines that the file is stored in the internal storage unit; a file acquiring unit that downloads the file specified by the designated file information from the server when the file presence identifying unit determines that the file is not stored in the internal storage unit; and a second file transmitting unit that transmits the file acquired by the file acquiring unit to the other mobile device.

According to another aspect of the present invention, there is provided a file exchange system including: a mobile device, another mobile device, and a server, the mobile device including: a file information acquiring unit that acquires file information representing a file managed by the server on a network from the server; a file information display unit that displays the file information acquired by the file information acquiring unit on a display unit; a file presence identifying unit that determines whether or not a file specified by file information designated by a user from among the file information displayed on the display unit is stored in an internal storage unit; a first file transmitting unit that transmits the stored file to the other mobile device when the file presence identifying unit determines that the file is stored in the internal storage unit; a file acquiring unit that downloads the file specified by the designated file information from the server when the file presence identifying unit determines that the file is not stored in the internal storage unit; and a second file transmitting unit that transmits the file acquired by the file acquiring unit to the other mobile device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating a folder information table stored in a file management server according to an embodiment of the present invention;

FIG. 5 is a diagram illustrating a file information table stored in a file management server according to an embodiment of the present invention;

FIG. 6 is a diagram illustrating a file management table stored in a mobile device according to an embodiment of the present invention;

DETAILED DESCRIPTION OF THE PREFERRED EMBODIMENTS

Hereinafter, exemplary embodiments of the present invention will be described with reference to the accompanying drawings.

System Configuration and General Operation

Figure 1:
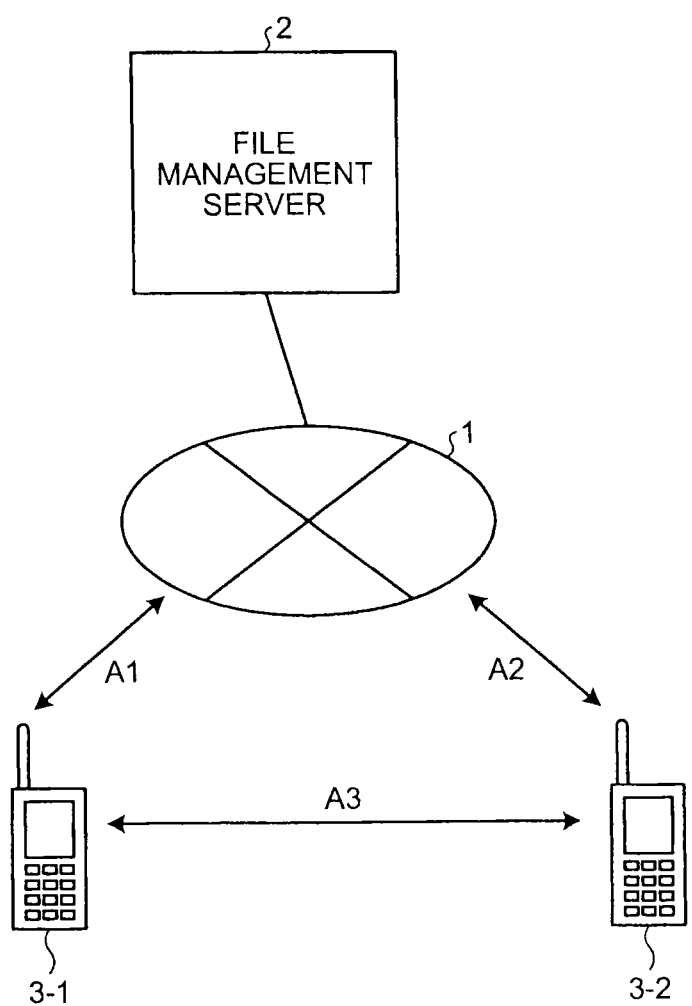
FIG. 1 is a diagram illustrating a file exchange system according to an embodiment of the present invention.

As illustrated in FIG. 1, a file exchange system according to an embodiment of the present invention includes a file management server 2 that is connected to a network 1 such as the Internet and mobile devices 3-1 and 3-2 that are connected to the network 1.

The mobile devices 3-1 and 3-2 can have a connection to the network 1 as illustrated by arrows A1 and A2 and perform communication with the file management server 2 via the network 1, respectively. The mobile devices 3-1 and 3-2 can perform communication with each other via the network 1 and can also perform communication directly with each other by near field communication such as Bluetooth (a registered trademark) or IrDA as illustrated by an arrow A3.

The file management server 2 has a function of providing an online storage service using a built-in hard disk, and stores and manages files such as image files uploaded from the mobile devices 3-1 and 3-2 in a storage area assigned to each user. The file management server 2 transmits a requested file to a mobile device of a request source in response to a download request from the mobile devices 3-1 and 3-2. The other functions will be described later.

The mobile devices 3-1 and 3-2 are portable terminal devices with a camera, which has a photographing function, a network communication function, and a near field communication function, such as a mobile telephone, a personal digital assistant (PDA), and a game machine. The mobile devices 3-1 and 3-2 can upload an image captured by the camera to the file management server 2. The mobile devices 3-1 and 3-2 can download a desired file from the file management server 2. Further, the mobile devices 3-1 and 3-2 can transmit a file stored in an internal storage unit or a file downloaded from the file management server 2 to the other party's mobile device, that is, can perform a file exchange.

Configuration of File Management Server

Figure 2:
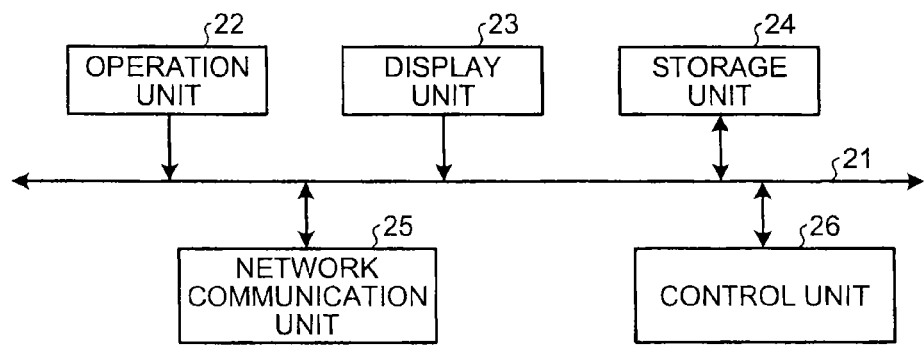
FIG. 2 is a block diagram of a file management server according to an embodiment of the present invention.

As illustrated in FIG. 2, the file management server 2 includes an operation unit 22 that includes an input device such as a mouse or a keyboard, a display unit 23 that includes a display device such as a liquid crystal display (LCD), a storage unit 24 that includes a storage device such as a hard disk, a network communication unit 25 that performs communication with the mobile devices 3-1 and 3-2 via the network 1, a control unit 26 that includes a central processing unit (CPU), a read only memory (ROM), and a random access memory (RAM) and controls the above components, and a bus 21 that connects the components with one another.

The ROM inside the control unit 26 or the storage unit 24 stores various programs or various data. The CPU implements various functional units as a means for controlling the whole file management server 2 and performing a flowchart of FIG. 7 which will be described later by loading the program stored in the ROM or the storage unit 24 into the RAM and executing the program.

The storage unit 24 stores the file transmitted from the user (the mobile devices 3-1 and 3-2) in the online storage area assigned to each user and stores management information thereof. The file management information for managing the file includes file information representing the file that is managed and folder information representing a folder in which the file information is stored. FIG. 4 illustrates a folder information table in which the folder information is stored, and FIG. 5 illustrates a file information table in which file information excluding a thumbnail of a file is stored.

As illustrated in FIG. 4, the folder information includes a folder ID of each folder, a folder name of a folder specified by the folder ID, a folder uniform resource locator (URL), and the number of files inside the folder. The folder URL represents the position, on the online storage area, of the folder specified by the folder ID. That is, the file information illustrated in FIG. 5 is stored in the folder, and the file information of FIG. 5 exists in each folder. Further, the folder URL is a link to the file information that is information of the file stored in the folder.

As illustrated in FIG. 5, the file information includes a file ID of each file, a file name of a file specified by the file ID, a thumbnail URL, a file URL, and a file update data and time. The file URL and the thumbnail URL represent the positions, on the online storage area, of the file and the thumbnail specified by the file ID, respectively.

Configuration of Mobile Device

Figure 3:
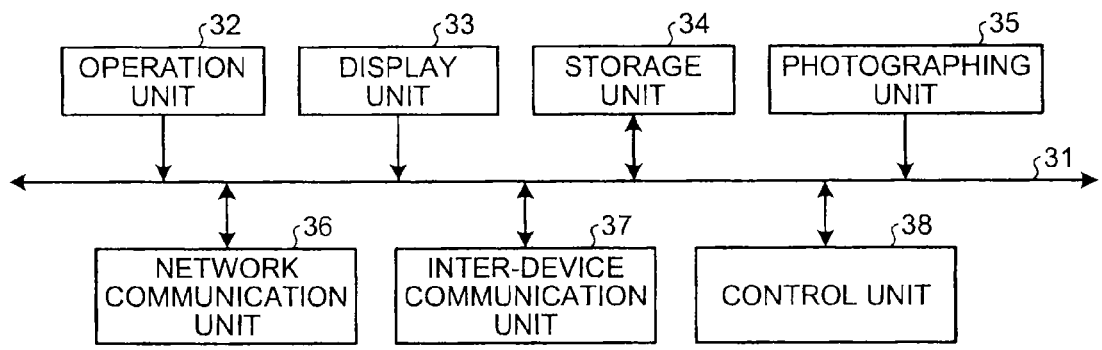
FIG. 3 is a block diagram of a mobile device according to an embodiment of the present invention.

The mobile devices 3-1 and 3-2 have the same configuration, and a block diagram thereof is illustrated in FIG. 3. As illustrated in FIG. 3, the mobile devices 3-1 and 3-2 include an operation unit 32 that includes various buttons, a display unit 33 that includes a display device such as an LCD, a storage unit 34 that includes a storage device such as a flash memory, a photographing unit 35 that includes an imaging device such as a charge coupled device (CCD) or a metal oxide semiconductor (MOS), a network communication unit 36 that performs communication with the file management server 2 or another mobile device via the network 1, an inter-device communication unit 37 that performs communication directly with another mobile device by near field communication such as Bluetooth (a registered trademark) or IrDA, a control unit 38 that includes a CPU, a ROM, and a RAM and controls the above components, and a bus 31 that connects the components with one another.

The ROM inside the control unit 38 or the storage unit 34 stores various programs or various data. The CPU implements various functional units as a means for controlling the whole mobile devices 3-1 and 3-2 and performing the flow of FIG. 7 which will be described later by loading the program stored in the ROM or the storage unit 34 into the RAM and executing the program.

The storage unit 34 includes a storage area that is dedicated to an application for using the online storage service (hereinafter, dedicated storage area) and a storage area that is shared by various applications (hereinafter, shared storage area). The file uploaded to the file management server 2 and the file downloaded from the file management server 2 are stored in the dedicated storage area but can be moved or duplicated to the shared storage area in response to the user's instruction from the operation unit 32. If the file is stored in the shared storage area, the file can be processed by a non online storage service application such as an image edit application.

FIG. 6 illustrates a file management table stored in the dedicated storage area. The table includes a file ID of each file, a file name of a file specified by the file ID, a thumbnail address, a file address, and a download date and time. Here, the thumbnail address and the file address represent storage addresses of the thumbnail and the file in the dedicated storage area, respectively. A blank column (a third row or below) represents that information is not written. That is, in the case of FIG. 6, a file 1_1 and a file 1_2 are all files downloaded so far.

Operation of File Exchange System

Figure 7:
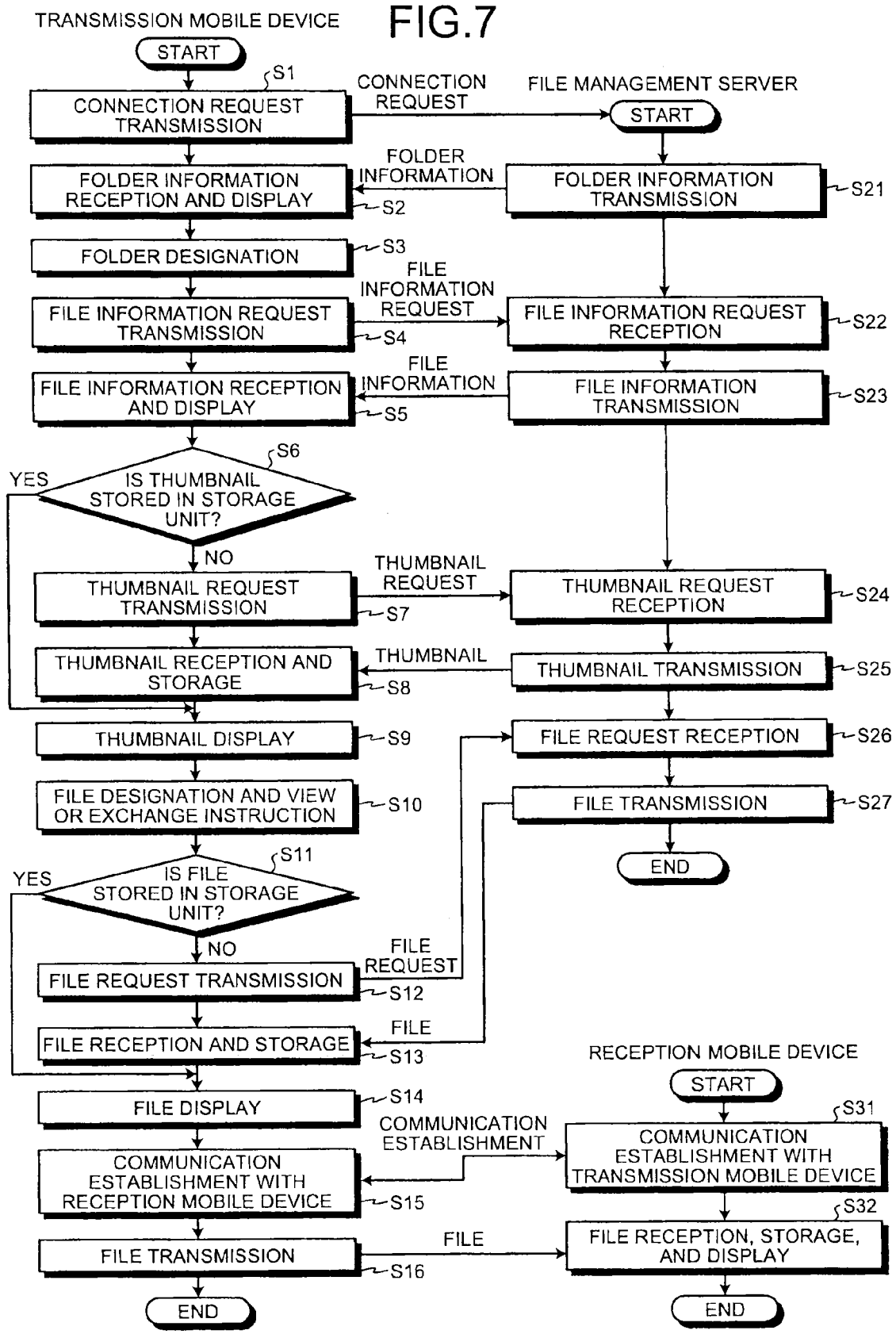
FIG. 7 is a flowchart illustrating an operation of a file exchange system according to an embodiment of the present invention.

An operation in which one of the mobile devices 3-1 and 3-2 in FIG. 1 transmits the file to the other will be described with reference to FIG. 7. In FIG. 7, a device transmitting the file is referred to as a transmission mobile device, and a device receiving the file is referred to as a reception mobile device. The mobile devices 3-1 and 3-2 have the same configuration, and it should be understood that the both can function as the transmission mobile device or the reception mobile device. As premises for the operation, it is assumed that an application for receiving the online storage service is installed at least in the transmission mobile device, and a storage area is assigned to the online storage area of the file management server 2.

First, when the user activates the application for receiving the online storage service through the operation unit 32 of the transmission mobile device, the transmission mobile device transmits a connection request signal to the file management server 2, in step S1. Here, when the application is activated, a log-in screen is displayed on the display unit 33, and the connection request signal is transmitted when the user inputs an ID and a password.

The file management server 2 starts the flow in response to reception of the connection request signal, reads the folder ID, the folder name, and the folder URL among the folder information from the folder information table (FIG. 4) stored in the online storage area of the user of the transmission mobile device, and transmits them to the transmission mobile device in step S21. In the case in which the number of folders is plural, transmission is sequentially performed with reference to the file information table (FIG. 5) based on the folder URL, for example, in order starting from the folder storing a file in which a file update data and time is new.

The transmission mobile device receives the folder information, stores the folder information in the RAM inside the control unit 38, and displays the folder name on the display unit 33 in step S2. In the case in which the number of folders is plural, a folder name list is displayed. When the user designates (selects) a desired folder name among one or more folder names displayed on the display unit 33 using the operation unit 32 in step S3, the transmission mobile device transmits a file information request signal that requests the file information of the file inside the folder specified by the designated folder name to the file management server 2 in step S4. The folder URL of the folder specified by the designated folder name is included in the file information request signal.

The file management server 2 receives the file information request signal in step S22, reads the file information stored in the file information management table (FIG. 5) on the online storage based on the folder URL included in the signal, and transmits the file information to the transmission mobile device in step S23.

The transmission mobile device receives the file information, stores the file information in the dedicated storage area of the storage unit 34, and displays the file name and the update date and time that are bibliographic items among the file information on the display unit 33 in step S5. Next, it is determined whether or not a thumbnail of each file is stored in the dedicated storage area of the storage unit 34 in step S6. When it is determined that the thumbnail of each file is stored in the dedicated storage area of the storage unit 34 (YES in step S6), the thumbnail is displayed on the display unit 33 in step S9. At this time, a text representing the bibliographic items and the thumbnail of each file are displayed together on the display unit 33.

Meanwhile, when it is determined that the thumbnail of each file is not stored in the dedicated storage area of the storage unit 34 (NO in step S6), a thumbnail request signal is transmitted to the file management server 2 in step S7. The thumbnail URL is included in the thumbnail request signal. The file management server 2 receives the thumbnail request signal in step S24, reads the thumbnail on the online storage based on the thumbnail URL included in the signal, and transmits the thumbnail to the transmission mobile device in step S25. The transmission mobile device receives the thumbnail transmitted from the file management server 2, stores the thumbnail in the dedicated storage area of the storage unit 34 in step S8, and then displays the thumbnail on the display unit 33 in step S9.

Here, the determination of step S6, that is, the determination as to whether or not the thumbnail of the file is stored in the storage unit 34 is performed as follows. If the thumbnail and the file have been downloaded from the online storage in the past, since necessary information has been stored in the file management table illustrated in FIG. 6, the control unit 38 performs the determination by referring to the management table.

Figure 8:
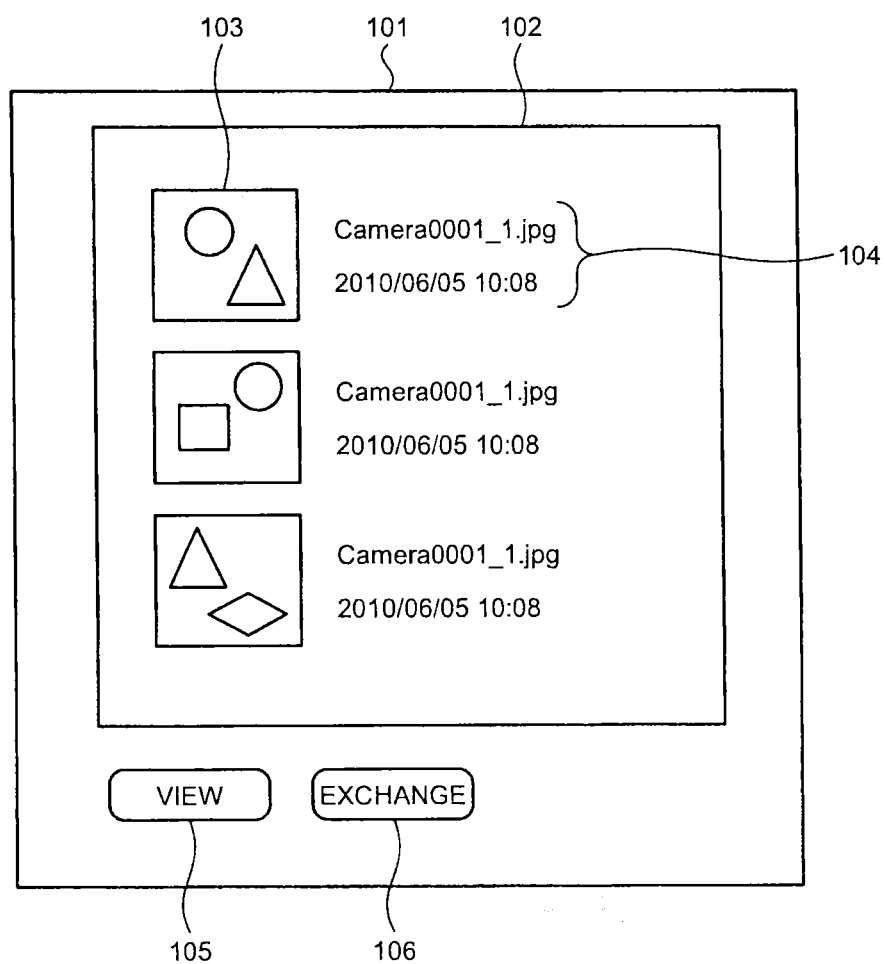
FIG. 8 is a diagram illustrating a file information display screen in a mobile device according to an embodiment of the present invention.

FIG. 8 illustrates an example of a screen displayed on the display unit 33 in step S9. As illustrated in FIG. 8, thumbnails 103 of 3 files and texts 104 of the bibliographic items of the respective files are displayed horizontally side by side, on the image display area 102 of the screen 101. That is, a thumbnail list and a file bibliographic item list are displayed. Below an image display area 102, a "view" button 105 and an "exchange" button 106 are displayed. Even though not shown, when a cursor is aligned with the thumbnail 103 and the text 104 of the bibliographic item, a cursor moving button for designating (selecting) the file is also displayed.

Next, when the user designates (selects) the file by aligning the cursor with a desired thumbnail using the operation unit 32 and presses the "view" button 105 or the "exchange" button 106 down in step S10, the control unit 38 determines whether or not the designated file is stored in the dedicated storage area of the storage unit 34 with reference to the file management table (FIG. 6) in step S11. When it is determined that the designated file is stored in the dedicated storage area of the storage unit 34 (YES in step S11), the file is displayed on the display unit 33 in step S14.

Meanwhile, when it is determined that the designated file is not stored in the dedicated storage area of the storage unit 34 (NO in step S11), a file request signal is transmitted to the file management server 2 in step S12. The file URL is included in the file request signal. The file management server 2 receives the file request signal in step S26. The file on the online storage is read based on the file URL included in the signal and transmitted to the transmission mobile device in step S27.

The transmission mobile device receives the file transmitted from the file management server 2, stores the file in the dedicated storage area of the storage unit 34 in step S13, and then displays the file on the display unit 33 in step S14.

When the instruction of step S10 has been "view," the process is finished. However, when the instruction of step S10 has been "exchange," communication is established with the reception mobile device in step S15, and then the file is transmitted to the reception mobile device in step S16.

The reception mobile device establishes communication with the transmission mobile device in step S31, then receives the file transmitted from the transmission mobile device, stores the file in the dedicated storage area of the storage unit 34, and displays the file on the display unit 33 in step S32.

As described above, according to the file exchange system of the present embodiment, it is determined whether or not the file of the thumbnail and the bibliographic item, which is designated by the user from among the lists of the thumbnail and the bibliographic item of the file displayed on the display unit 33 of the transmission mobile device, is stored in the dedicated storage area of the storage unit 34 inside the device. When it is determined that the file is stored, the file is read from the storage unit 34 and transmitted to the reception mobile device. However, when it is determined that the file is not stored, the file is downloaded from the file management server 2 and transmitted to the reception mobile device. Thus, the user of the transmission mobile device needs not know whether the file to be transmitted exists in the transmission mobile device or the file management server 2 and can transmit the file by a common operation regardless of a place where the file exists.

Further, the following modifications (1) to (8) can be made in connection with the embodiment of the present invention.

(1) In step S10, an order of file designation and instruction of "view" and "exchange" may be reversed.

(2) In step S10, when "view" has been instructed, in order to exchange the file that is displayed on the display unit 33 in step S14, "exchange" is instructed.

(3) In the case of performing communication establishment of step S15, a mobile device that exists within a communicable range is searched, and communication establishment with the discovered mobile device is performed.

(4) In the case of performing communication establishment of step S15, an address book previously stored in the storage unit 34 is displayed on the display unit 33, and communication establishment is performed with a mobile device having an address that the user selects from the address book.

(5) The transmission mobile device executes communication establishment with the reception mobile device at arbitrary timing between step S1 and step S14.

(6) After step S32, the reception mobile device uploads the received file to the file management server 2. The thumbnail of the received file may be created and stored in the storage unit 34. The file management server 2 creates the thumbnail of the file uploaded by the reception mobile device, stores the thumbnail of the file in the storage unit 34, and transmits the thumbnail of the file to the reception mobile device. When the thumbnail of the file received from the transmission mobile device has been created and stored in the storage unit 34, the reception mobile device rewrites the thumbnail to use the more precise thumbnail received from the file management server 2.

(7) The determination results of step S6 and step S11 are displayed on the display unit 33.

(8) The online storage is installed outside the file management server 2, that is, on the network 1.

Appearance of Mobile Device

Figure 9:
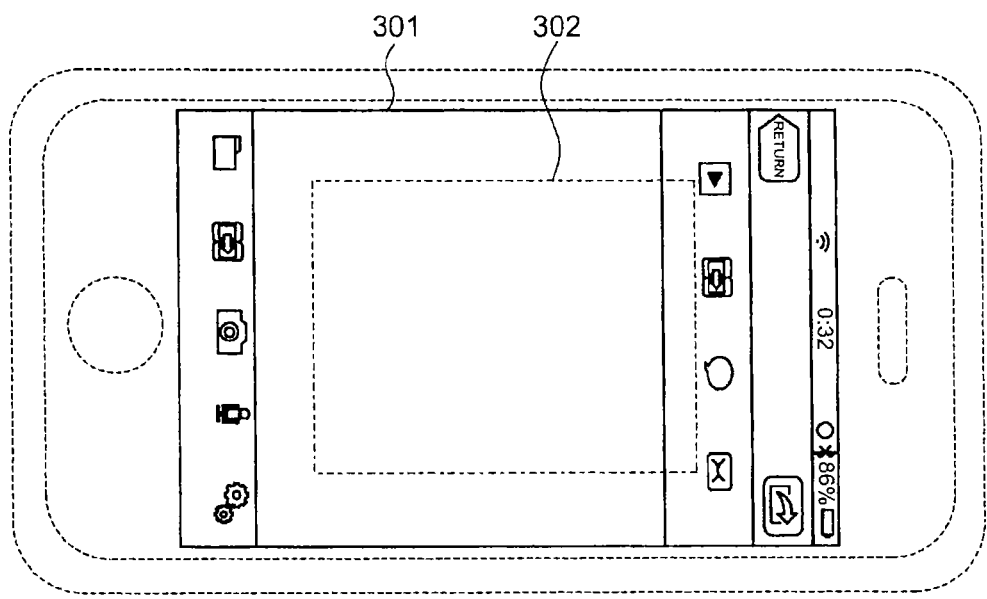
FIG. 9 is an exemplary front view of an appearance of a mobile device according to an embodiment of the present invention.
Figure 10:
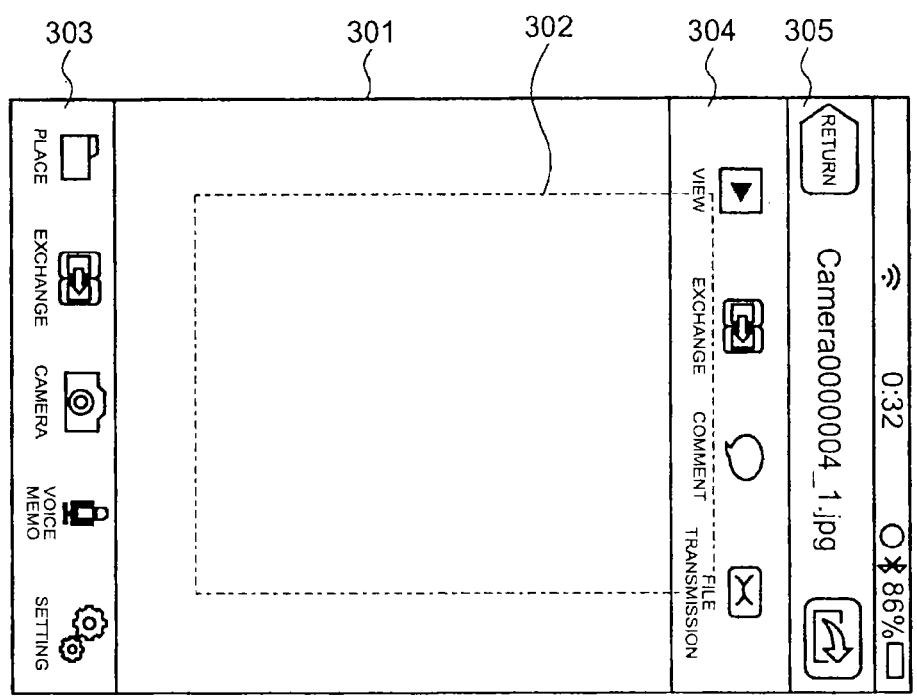
FIG. 10 is an enlarged view of a display panel in an exemplary front view of an appearance of a mobile device according to an embodiment of the present invention.
Figure 11:
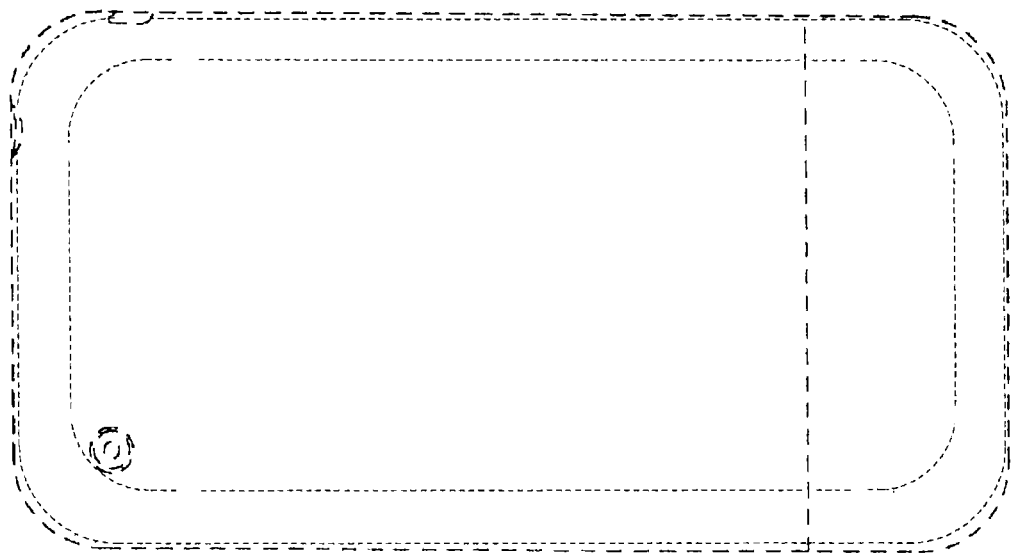
FIG. 11 is an exemplary back view of an appearance of a mobile device according to an embodiment of the present invention.
Figure 12:
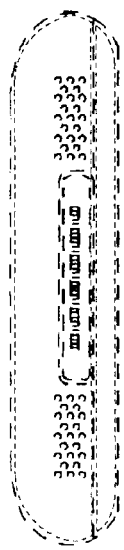
FIG. 12 is an exemplary left side view of an appearance of a mobile device according to an embodiment of the present invention.
Figure 13:
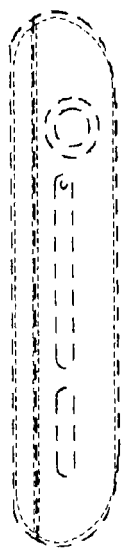
FIG. 13 is an exemplary right side view of an appearance of a mobile device according to an embodiment of the present invention.
Figure 14:
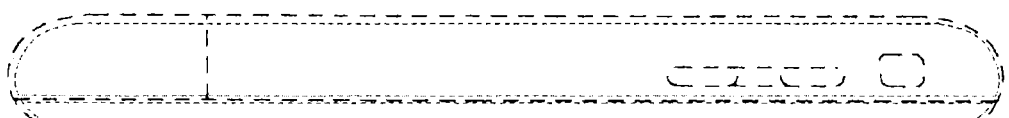
FIG. 14 is an exemplary plan view of an appearance of a mobile device according to an embodiment of the present invention.
Figure 15:
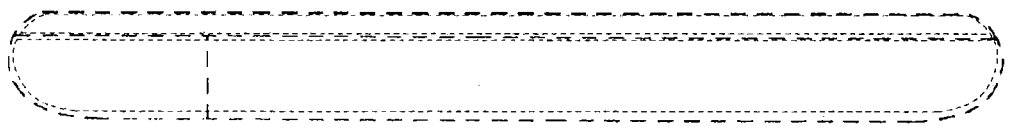
FIG. 15 is an exemplary bottom view of an appearance of a mobile device according to an embodiment of the present invention.

An example of an appearance of the mobile devices 3-1 and 3-2 will be described with reference to FIGS. 9 to 15. FIG. 9 is a front view, FIG. 10 is an enlarged view of a display panel in the front view, FIG. 11 is a back view, FIG. 12 is a left side view, FIG. 13 is a right side view, FIG. 14 is a plan view, and FIG. 15 is a bottom view. In FIGS. 9 to 15, a display panel and an icon and a character displayed on the display panel are indicated by a solid line, an image display area inside the display panel is indicated by a dash-dotted line, and the other things (for example, a visible outline of a case) is indicated by a broken line.

As illustrated in FIG. 9, a display panel 301 is arranged on a front side of the case of the mobile device, and an image display area 302 is arranged on an inner central part thereof. Here, for convenience, the inside of the image display area 302 is blank.

As illustrated in FIG. 10, a "place" icon, an "exchange" icon, a "camera" icon, a "voice memo" icon, and a "setting" icon are displayed on an area 303 of a left end of the display panel 301 in order from above. Further, a "view" icon, an "exchange" icon, a "comment" icon, and a "file transmission" icon are displayed on an area 304 of a right part of the display panel in order from above. The icons are configured as buttons on a touch panel, and by pressing an icon or a character on the left side thereof down, it is possible to have the mobile device to perform a predetermined operation. A right end of the image display area 302 has an overlap with a character of an icon arranged on the area 304, but the character of the icon is visible even in a state in which an image is displayed on the image display area 302.

A "return" icon is displayed in an upper part of an area 305 arranged on the right side of the area 304, and an icon for storing an image file displayed on the image display area 302 in the storage unit 34 as a photographic album is displayed in a lower part thereof. A character string representing attribute information of an image displayed on the image display area 302 is displayed between the icons.

A mobile device of the present invention acquires file information representing a file managed by a server on a network from the server and displays the file information. The mobile device determines whether or not a file specified by file information designated by a user from among the displayed file information is stored in the device. When it is determined that the file is stored in the device, the file is transmitted to another mobile device. When it is determined that the file is not stored in the device, the file is downloaded from the server and transmitted to another mobile device.

According to the present invention, in the case of exchanging a file managed by a server on a network between mobile devices, a user can perform an exchange by the same operation regardless of an accumulation place of an exchange target file. Accordingly, even if the user does not know the accumulation place of the exchange target file, the file exchange can be performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile device connected to another mobile device and an external information processing apparatus via a network, the mobile device comprising:

a display;

a storage that stores therein a first file and first file information identifying the first file;

and circuitry configured to acquire, from the external information processing apparatus via the network, second file information identifying a second file that is not stored in the storage but is stored in the external information processing apparatus;

display, on a screen of the display, the first file information and the second file information;

accept, on the screen, a selection of a desired file by accepting a selection of the first file information or the second file information by a user;

accept a request by the user for transmitting the selected desired file to the another mobile device; and according to the request, transmit the first file from the storage to the another mobile device when the selected desired file corresponds to the first file, and, when the selected desired file corresponds to the second file, acquire the second file from the external information processing apparatus via the network without the user implementing an operation of downloading the second file from the external information processing apparatus, store the acquired second file in the storage, and transmit the stored second file to the another mobile device.

2. The mobile device according to claim 1, wherein the screen allows selection of the desired file and allows selection of the request for transmitting the selected desired file.

3. The mobile device according to claim 1, wherein the display displays the desired file on the screen according to the accepted request for transmitting the selected desired file, and the circuitry accepts, via the screen, the request for transmitting the selected desired file to the another mobile device and a request to display the desired file on the screen.

4. The mobile device according to claim 1, wherein the circuitry accepts the request for transmitting the selected desired file by selection of a button displayed on the screen, the display displays the selected desired file on the screen, and the circuitry transmits the selected desired file to the another mobile device.

5. The mobile device according to claim 1, wherein the circuitry is further configured to perform a communication establishment process with the another mobile device; and the circuitry transmits the selected desired file to the another mobile device with which the communication establishment process has been performed.

6. The mobile device according to claim 5, wherein at least an application program for performing the functions of the circuitry is installed in the mobile device, and the circuitry performs the communication establishment process with the another mobile device in response to activation of the application program.

7. The mobile device according to claim 6, wherein the circuitry performs the communication establishment process with the another mobile device, in which the same application program as that of the mobile device is installed, in order to transmit data to the another device.

8. The mobile device according to claim 1, wherein the first file information and the second file information include at least one of bibliographic data of the first and second files and thumbnails of images corresponding to the first and second files.

9. The mobile device according to claim 1, wherein the storage stores the first file information, which is a bibliographic item or a thumbnail of the first file, and the circuitry acquires the second file information, which is a bibliographic item or a thumbnail of the second file.

10. A system, comprising:

a first mobile device; and a second mobile device that receives a file from the first mobile device via a network, wherein the first mobile device includes a display;

a storage that stores therein a first file and first file information identifying the first file;

and circuitry configured to acquire, from an external information processing apparatus via the network, second file information identifying a second file that is not stored in the storage but is stored in the external information processing apparatus;

display, on a screen of the display, the first file information and the second file information;

accept, on the screen, a selection of a desired file by accepting a selection of the first file information or the second file information by a user;

accept a request by the user for transmitting the selected desired file to second mobile device; and according to the request, transmit the first file from the storage to the second mobile device when the selected desired file corresponds to the first file, and, when the selected desired file corresponds to the second file, acquire the second file from the external information processing apparatus via the network without the user implementing an operation of downloading the second file from the external information processing apparatus, store the acquired second file in the storage, and transmit the stored second file to the second mobile device; and the second mobile device includes a receiver that receives the selected desired file from the first mobile device.

11. The system according to claim 10, further comprising the external information processing apparatus.

12. The system according to claim 10, wherein the circuitry of the first mobile device is further configured to perform a communication establishment process with the second mobile device, in which the same application program as that of the first mobile device is installed, in order to transmit data to the second mobile device.

13. A method performed by a mobile device having a storage storing a first file and first file information identifying the first file, the mobile device connected to another mobile device and an external information processing apparatus via a network, the method comprising:

acquiring, from the external information processing apparatus via the network, second file information identifying a second file that is not stored in the storage but is stored in the external information processing apparatus;

displaying, on a screen of the display, the first file information and the second file information;

accepting, on a screen, a selection of a desired file by accepting a selection of the first file information or the second file information by a user;

accepting a request by the user for transmitting the selected desired file to the another mobile device; and according to the request, transmitting the first file from the storage to the another mobile device when the selected desired file corresponds to the first file, and, when the selected desired file corresponds to the second file, acquiring the second file from the external information processing apparatus via the network without the user implementing an operation of downloading the second file from the external information processing apparatus, storing the acquired second file in the storage, and transmitting the stored second file to the another mobile device.

14. The method according to claim 13, wherein the first file information and the second file information include at least one of bibliographic data of the first and second files and thumbnails of images corresponding to the first and second files.

15. A non-transitory computer-readable storage medium storing computer-readable instructions thereon, which, when executed by a mobile device having a storage storing a first file and first file information identifying the first file, the mobile device connected to another mobile device and an external information processing apparatus via a network, cause the mobile device to perform a method comprising:

acquiring, from the external information processing apparatus via the network, second file information identifying a second file that is not stored in the storage but is stored in the external information processing apparatus;

displaying, on a screen of the display, the first file information and the second file information;

accepting, on a screen, a selection of a desired file by accepting a selection of the first file information or the second file information by a user;

accepting a request by the user for transmitting the selected desired file to the another mobile device; and according to the request, transmitting the first file from the storage to the another mobile device when the selected desired file corresponds to the first file, and, when the selected desired file corresponds to the second file, acquiring the second file from the external information processing apparatus via the network without the user implementing an operation of downloading the second file from the external information processing apparatus, storing the acquired second file in the storage, and transmitting the stored second file to the another mobile device.

16. The non-transitory computer-readable storage medium according to claim 15, wherein the first file information and the second file information include at least one of bibliographic data of the first and second files and thumbnails of images corresponding to the first and second files.

* * * * *